Patented Feb. 3, 1953

2,627,468

UNITED STATES PATENT OFFICE 2,627,468

SOYA-BEAN OIL AND METHOD OF PRODUCING THE SAME

Hans W. Vahlteich, Englewood, N. J., Chester M. Gooding, Staten Island, N. Y., and Daniel Melnick, Teaneck, N. J., assignors to The Best Foods, Inc., New York, N. Y., a corporation of New Jersey No Drawing. Application March 16, 1951, Serial No. 216,100

11 Claims. (Cl. 99—144)

This invention relates to soya bean oil and more particularly to hydrogenated and winterized soya bean oil for salad oil, such as that used in mayonnaise.

Mayonnaise with good flavor stability does not possess sufficient freeze resistance to overcome some of the handling by the housewife. Mayonnaise can usually withstand ordinary refrigeration temperatures of about 50° F. However, on those occasions when the housewife lowers the temperature of the refrigerator for making frozen desserts, for example, oil emulsion failure occurs with ensuing oil separation of mayonnaise stored under such conditions. To overcome this defect, corn oil has been used as a substitute for cottonseed or other salad oil in mayonnaise, but aside from the limited available supply of corn oil, the corn oil does not possess the desired degree of flavor stability to warrant its extensive use for this purpose, especially during grocery shelf storage at summer temperatures. Refined soya bean oil is sometimes used as a means of avoiding emulsion failure, but such soya bean oil has only limited value in this respect and reverts in flavor to render substantially impossible its use in quality mayonnaise.

In accordance with this invention, a hydrogenated and winterized soya bean oil is provided which when used as the oil component of the mayonnaise produces a mayonnaise which has a marked freeze resistance and emulsion stability despite agitation and does not manifest the flavor reversion encountered with the use of refined soya bean oil for this purpose. Mayonnaise prepared with the soya bean oil of this invention has a freeze resistance and flavor stability equal to that prepared from corn oil.

The hydrogenated and winterized soya bean oil of this invention has an iodine value of 100 to 120 and preferably of 110 to 120. It contains less than 5% and preferably less than 3½% of conjugated dienoic acid components; less than 0.2%, and preferably less than 0.1% of conjugated trienoic acid components, and less than 0.02%, and preferably less than 0.015% of tetraenoic acid components.

Mayonnaise is produced from the soya bean salad oil of this invention by incorporating such soya bean oil either along or with other vegetable oils with vinegar, eggs, salt and other ingredients in the manner ordinarily employed for this purpose (e. g., in accordance with standard for mayonnaise of the Federal Security Agency, Federal Register, August 12, 1950, pp. 5227–5232). Preferably, however, incorporation of oxygen in the mayonnaise should be avoided by protecting the product during processing, for example, with nitrogen.

The soya bean oil of this invention is produced by hydrogenating a refined soya bean oil to an iodine value of 100 to 120 and preferably 110 to 120. After the hydrogenation the resulting hydrogenated oil is cooled. The solid components in the oil are then separated from the oil by any suitable means, such as filtration or centrifugation.

The soya bean oil of this invention sometimes has a cold test of as little as 10 minutes. However, despite such a low value for the cold test, the soya bean oil is eminently satisfactory for use as the salad oil in mayonnaise and has adequate freeze resistance. Heretofore, the standard cold test (Official Method Cc 11-42 of the Americal Oil Chemists' Society) of the salad oil has been the criterion for determining the relative freeze resistance of the mayonnaise produced from the tested oil, and it has been generally accepted that an oil of a cold test of 5½ hours (freedom from clouding at 32° F.) is the bare minimum value for satisfactory use in mayonnaise. Likewise, it was believed that the higher the cold test, the greater is the resistance to freezing of the mayonnaise. Contrary to this teaching, it has been found that cold test values of the soya salad oil of this invention bear little or no relationship to the ability of a mayonnaise to resist freezing and that the cold test values do not serve as an index of stability to lower temperatures of mayonnaise produced from such oils.

The hydrogenation of the refined soya bean oil is conducted under such conditions that an iodine value of 100 to 120 and preferably 110 to 120 is obtained and that the conjugated dienoic acid components of the resulting hydrogenated oil do not exceed 5% and preferably 3½%, the conjugated trienoic acid components do not exceed 0.2% and preferably 0.1%, and the conjugated tetraenoic acid components do not exceed 0.02% and preferably 0.015%. The amounts of conjugated components in the hydrogenated oil are determined by the method according to B. A. Brice et al. in Oil and Soap XXII, 219 (1945).

After hydrogenation the oil is cooled and the solid components in the oil are separated by filtration, centrifugation, decantation or other suitable means. It is desirable to use different conditions of crystallization, depending upon the degree of hydrogenation to which the oil is subjected. For example, when an oil is hydrogenated to an iodine value of 100, the crystallization temperature may be relatively high, such as 60° to 65° F. and preferably the oil is cooled relatively slowly, such as over a period of 2 to 3 days, whereas when hydrogenation to an iodine value of 120 is desired, the crystallization temperature may be as low as 40° F. or lower and the rate of cooling relatively rapid, such as 18 to 48 hours. A crystallization temperature of 43° to 55° F. has been found satisfactory for oils hydrogenated to an iodine value of 110 to 115. It has also been found desirable to permit the oil to remain at the temperature to which it is cooled for a period of one day or longer. The temperature to which the oil is cooled is maintained during the separation of the solid components of the oil therefrom.

The soya bean oils of this invention may be improved for certain purposes by incorporating in them a monoester of citric acid as described in U. S. Patents 2,485,631 and 2,485,633 granted on October 25, 1949 to The Best Foods, Inc., as assignee of H. W. Vahlteich, C. M. Gooding and R. H. Neal.

A more comprehensive understanding of this invention is obtained by reference to the following examples:

EXAMPLE 1

Twenty-one thousand pounds of soya bean oil of 135.2 iodine value was hydrogenated at 330°–350° F. and at 25 pounds pressure to an iodine value of 101.4 using a nickel catalyst sold under the name of Rufert's catalyst and described in U. S. Patent 2,424,811 (July 29, 1947). Substantially any other nickel catalyst may be employed, such as that disclosed in U. S. Patent 2,320,063 granted on May 25, 1943 to The Best Foods, Inc., as assignee of C. J. Borkowski and J. L. Schille. The hydrogenated oil was filtered to remove catalyst and was transferred to a tank fitted with cooling coils. The temperature was gradually lowered from 128° F. over a period of 72 hours to a low point of 60° F. At the end of 110 hours the crystallized portion was separated from the chilled oil by filtration under air pressure. The filtered oil was then deodorized at 440° F. There was obtained about 16,000 pounds of oil of iodine value 105.4 which in the standard cold test gave a value of 10 minutes and was solid in one hour. By all past standards this oil should have been entirely unsatisfactory for use in mayonnaise.

The titer point of the filtrate was 24.2° C. and that of the filter cake was 32.0° C. The filtrate contained 4.7% of conjugated dienoic acid components, 0.12% of conjugated trienoic acid components and 0.01% of conjugated tetraenoic acid components. The total dienoic, trienoic and tetraenoic acid components, whether conjugated or non-conjugated, were respectively 25.0%, 1.4% and 0.01%. The crystallized material collected in the form of a filter cake was found to have a melting point of 95.0° F. and an iodine value of 88.7.

The anti-flavor reversion characteristics of the soya bean oil of this example and the other examples is improved by incorporating in it monoisopropyl citrate or other monoester of citric acid. The monoisopropyl citrate is added to the oil immediately after deodorization and before exposure to the atmosphere as a solution of the monoisopropyl citrate dissolved in the monoglycerides of the fatty acids derived from the soya bean oil of the example as described in Example 2 of U. S. Patent 2,485,631. An effective amount of monoisopropyl citrate added to the oil is 0.002 to 0.005% of the monoester by weight of the oil.

Mayonnaise was prepared from the foregoing oil in the usual manner and also, mayonnaise was made from a mixture of this oil with an equal part by weight of cottonseed salad oil having a cold test of 15½ hours. The finished mayonnaise products were normal in all respects and had resistance to emulsion failure compared with cottonseed oil mayonnaise as shown in the following table:

*In air at 23°–27° F.—hours to break-point*

| | Hours |
|---|---|
| Mayonnaise made with cottonseed oil | 10 |
| Mayonnaise made with cottonseed oil plus soya salad oil of Example 1 (equal parts) | 44 |
| Mayonnaise made with 100% soya salad oil of Example 1 | 68 |

The resistance to emulsion failure is determined by subjecting a plurality of samples of the mayonnaise under test to a temperature of 23° to 27° F., withdrawing one of the samples at intervals from this low temperature, raising the withdrawn sample to room temperature and observing whether a definite break between the oleaginous and aqueous component occurs. The minimum time required to effect such a break is the value appearing in the above table.

EXAMPLE 2

Example 1 was repeated except that the oil was hydrogenated to an iodine value of 114.4. The oil was cooled to 45° F., over a period of 48 hours and after permitting the oil to remain at 45° F. for an additional 44 hours, the crystallized components separated therefrom. This oil yielded 8.3% of stearine of melting point 95.5° F. and iodine value 92.0. The filtrate was deodorized at 440° F. The oil was found to have a cold test of 1½ hours and contained 2.2% of conjugated dienoic acid components, 0.04% of conjugated trienoic acid components and 0.005% of conjugated tetraenoic acid components. The total dienoic, trienoic and tetraenoic acid components, whether conjugated or non-conjugated, in the oil were, respectively, 38.4%, 3.5% and 0.005%. Mayonnaise containing equal parts of cottonseed oil mixed with the oil of Example 2 was of excellent quality and stability. The mayonnaise prepared from the oil of this example was stable for 160 hours at 25°–28° F.

EXAMPLE 3

Example 1 was repeated by hydrogenating to an iodine value of 103.8. Crystallization was accomplished by cooling the hydrogenated oil to 60° F. over a period of 24 hours. It was held for another 16 hours after which it was filtered. The filtered oil, having an iodine value of 108.6, was deodorized at 440° F. The deodorized oil had a cold test value of 1 hour to 1¼ hours and was solid in 2½ hours. When mixed with a cottonseed salad oil having a 20-26 hours cold test value, the cold test value of the resulting mixture was 7-12 hours and the mixture was solid in 20-26 hours.

The oil contained 3.9% of conjugated dienoic acid components, 0.09% of conjugated trienoic acid components and 0.009% of conjugated tetraenoic acid components. The glycerides of this soya salad oil were composed of 2.5% trienoic, 30.8% dienoic, 50.6% monoenoic and 11.8% saturated acids.

Mayonnaise prepared from the hydrogenated and deodorized soya oil resisted emulsion failure for more than 204 hours at 23°–27° F. and the 50% mixture with the cottonseed mayonnaise was stable for 40 hours. A marked improvement in freeze resistance of mayonnaise resulted from the use of hydrogenated and deodorized soya oil of this example since mayonnaise made from the cottonseed salad oil exhibited emulsion failure in less than 18 hours at the same temperature.

EXAMPLE 4

Example 1 was repeated by hydrogenating to an iodine value of 113.9. The resulting oil was crystallized by cooling to 48.5°–49° F. during 28 hours and holding at that temperature for an additional 12 hours. It was then filtered. After deodorization of the filtered oil its iodine value was 115.3 and its cold test was 2–2½ hours and it was solid in less than 26 hours at 32° F. The finished oil contained in the form of conjugated and non-conjugated 0.006% tetraenoic, 3.3% trienoic, 37.3% dienoic, 42.8% monoenoic and 12.2% saturated acids in its glycerides. The amounts of conjugated dienoic, trienoic and tetraenoic acid components in the deodorized oil were 2.8%, 0.08% and 0.006%, respectively.

Mayonnaise prepared from this hydrogenated and deodorized soya oil was stable for more than 204 hours at 23°–27° F. and in admixture with an equal weight of cottonseed salad oil, mayonnaise resisted emulsion failure for 64 hours.

While the soya bean oil of this invention has been described with particular reference to its use in mayonnaise, that description is illustrative and is not to be construed as a limitation of the invention, since such soya bean oil may be used for numerous other purposes, such as a component in other salad dressings or the liquid fraction of a compounded shortening or margarine oil or wherever a liquid vegetable oil of good stability is required. It may, of course, be mixed with other vegetable oils in any proportions for any required purpose.

The mixtures of the hydrogenated, winterized soya bean oils with winterized vegetable oils and mayonnaise containing these mixtures of oils disclosed in the present application are the subject matter of our copending continuation-in-part application Serial No. 268,935, filed January 29, 1952.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A hydrogenated and winterized soya bean oil suitable for use as a salad oil having an iodine number of 100 to 120 and containing less than 5% of conjugated dienoic acid components, less than 0.2% of conjugated trienoic acid components and less than 0.02% of conjugated tetraenoic acid components.

2. A hydrogenated and winterized soya bean oil suitable for use as a salad oil having an iodine number of 110 to 120 and containing less than 5% of conjugated dienoic acid components, less than 0.2% of conjugated trienoic acid components, and less than 0.02% of conjugated tetraenoic acid components.

3. A hydrogenated and winterized soya bean oil suitable for use as a salad oil having an iodine number of 100 to 120 and containing less than 3½% of conjugated dienoic acid components, less than 0.1% of conjugated trienoic acid components, and less than 0.015% of conjugated tetraenoic acid components.

4. A hydrogenated and winterized soya bean oil suitable for use as a salad oil having an iodine number of 110 to 120 and containing less than 3½% of conjugated dienoic acid components, less than 0.1% of conjugated trienoic acid components and less than 0.015% of conjugated tetraenoic acid components.

5. A mayonnaise comprising vinegar, eggs, salt and a hydrogenated and winterized soya bean oil having an iodine number of 100 to 120 and containing less than 5% of conjugated dienoic acid components, less than 0.2% of conjugated trienoic acid components and less than 0.02% of tetraenoic acid components.

6. A mayonnaise comprising vinegar, eggs, salt, and a hydrogenated and winterized soya bean oil having an iodine number of 110 to 120 and containing less than 5% of conjugated dienoic acid components, less than 0.2% of conjugated trienoic acid components, and less than 0.02% of tetraenoic acid components.

7. A mayonnaise comprising vinegar, eggs, salt, and a hydrogenated and winterized soya bean oil having an iodine number of 100 to 120 and containing less than 3½% of conjugated dienoic acid components, less than 0.1% of conjugated trienoic acid components, and less than 0.015% of tetraenoic acid components.

8. A mayonnaise comprising vinegar, eggs, salt and a hydrogenated and winterized soya bean oil having an iodine number of 110 to 120 and containing less than 3½% of conjugated dienoic acid components, less than 0.1% of conjugated trienoic acid components and less than 0.015% of tetraenoic acid components.

9. The method of producing an improved hydrogenated soya bean oil suitable for use as a salad oil comprising hydrogenating a refined soya bean oil to an iodine number of 100 to 120, cooling the resulting hydrogenated oil and separating the solid components therefrom.

10. The method of producing an improved hydrogenated soya bean oil suitable for use as a salad oil comprising hydrogenating a refined soya bean oil to an iodine number of 110 to 120 and cooling the resulting hydrogenated oil and separating the solid components therefrom.

11. The method of producing an improved hydrogenated soya bean oil suitable for use as a salad oil comprising hydrogenating a refined soya bean oil to an iodine number of 110 to 120 and cooling the resulting oil to 43°–47° F. and separating the solid components therefrom.

HANS W. VAHLTEICH.
CHESTER M. GOODING.
DANIEL MELNICK.

REFERENCES CITED

The following references are of record in the file of this patent:

UNITED STATES PATENTS

| Number | Name | Date |
|---|---|---|
| 2,136,653 | Moore et al. | Nov. 15, 1938 |
| 2,293,729 | Gudheim | Aug. 25, 1942 |
| 2,353,229 | Durkee | July 11, 1944 |